United States Patent
Suzuki et al.

(10) Patent No.: US 6,240,443 B1
(45) Date of Patent: May 29, 2001

(54) COMMUNICATION SYSTEM AND COMMUNICATION METHOD

(75) Inventors: Gen Suzuki, Fujisawa; Hiroya Tanigawa; Atsuhito Nakase, both of Yokohama; Yoshinori Ohkuvo, Kawasaki; Takashi Yamagata, Yokohama, all of (JP)

(73) Assignee: NTT Software Corporation, Kanagawa (JP)

( * ) Notice: Subject to any disclaimer, the term of this patent is extended or adjusted under 35 U.S.C. 154(b) by 0 days.

(21) Appl. No.: 09/204,798

(22) Filed: Dec. 3, 1998

(30) Foreign Application Priority Data

Dec. 5, 1997 (JP) .................................................. 9-335249

(51) Int. Cl.[7] ...................................................... G06F 15/16
(52) U.S. Cl. ............................................ 709/204; 709/224
(58) Field of Search .................................... 709/203, 204, 709/206, 225, 228, 232, 224, 227; 704/2

(56) References Cited

U.S. PATENT DOCUMENTS

| | | | |
|---|---|---|---|
| 5,764,916 | | 6/1998 | Busey et al. ........................ 709/227 |
| 5,828,839 | * | 10/1998 | Moncreiff ............................ 709/204 |
| 5,832,229 | * | 11/1998 | Tomoda et al. ..................... 709/227 |
| 5,862,330 | * | 1/1999 | Anupam et al. ..................... 709/204 |
| 5,941,947 | * | 8/1999 | Brown et al. ........................ 709/225 |
| 5,987,401 | * | 11/1999 | Trudeau .................................... 704/2 |
| 6,023,729 | * | 2/2000 | Samuel et al. ....................... 709/228 |
| 6,047,327 | * | 4/2000 | Tso et al. ............................ 709/232 |
| 6,055,570 | * | 4/2000 | Nielsen ............................... 709/224 |

* cited by examiner

Primary Examiner—Ayaz Sheikh
Assistant Examiner—Patrice Winder
(74) Attorney, Agent, or Firm—Kenyon & Kenyon

(57) ABSTRACT

The present invention discloses a communication system in a network system having a plurality of user terminals connected to a communication network and a plurality of network resources accessed by the user terminals, the communication system having a communication part which makes the user terminals accessing the same network resource exchange and share communication information. The communication part has a communication server and a communication controlling part, provided in each user terminal, for obtaining information of the user terminals accessing the same network resource and for exchanging the communication information with the user terminals through the communication server. The communication server groups the user terminals accessing the same network resource as one group on the basis of resource locators notified of by the user terminals, and distributes information of the user terminals of the one group to the user terminals of the one group.

8 Claims, 9 Drawing Sheets

COMMUNICATION SYSTEM AND COMMUNICATION METHOD

BACKGROUND OF THE INVENTION

1. Field of the Invention

The present invention generally relates to a communication system transmitting information for communication between user terminals connected to each other by way of communication networks such as the Internet, and, more particularly, to a communication system transmitting communication information between user terminals which access network resources by way of communication networks.

Further, the present invention is concerned with a network system including the communication system.

2. Description of the Related Art

A chat system, for example, NetMeeting™ of Microsoft Corp., is known as a communication system which uses communication networks such as the Internet. In this case, if a user accesses a server used only for the chat system, a list of names of the users is shown to the user, and the user can chat with the other users.

In the case of Onlive™ provided by OnliveTechnology Inc., it is known that a virtual image of a user accessing a virtual space is shown in the virtual space and the user can chat with virtual images of the other users which the user meets in the virtual space.

Further, U.S. Pat. No. 5,764,916 of ichat Inc. discloses a chat system using a server only for chat. In the system, a client sends a chat message which contains HTML (Hyper Text Markup Language) including a URL (Uniform Resource Locator) to another client. Then, the client who receives the message can chat while they are watching the same HP (Home Page) of the URL.

Proxy servers are known as devices which manage both IP addresses of user terminals necessary for chat and URLs which the user terminals access.

However, in the system such as Netmeeting™ used only for chat and separated from an HP, a user cannot know which HP the other users are accessing while the user is chatting with the other users. Therefore, it is not easy for a plurality of users to chat while they are accessing the same HP.

In a chat system such as the Onlive™ system which is contained in the WEB, users can chat while they are accessing an Onlive™ HP. However, on other home pages which do not include any chat system, users cannot chat while sharing the same home pages.

Further, the method which is disclosed in the U.S. Pat. No. 5,764,916 of ichat Inc. has the following disadvantages. A user must write URLs in chat messages and send the messages, and it is not obvious to the user that the receiving user is really accessing the home page of the URL. Also if a user moves to another home page, the other users cannot know about the move unless the user lets them know about the move in some way. Therefore, users cannot chat while sharing home pages dynamically by the method.

SUMMARY OF THE INVENTION

It is a general object of the present invention to provide a network-resource-linked-type communication system, a communication method and a computer usable medium in which the above disadvantages are eliminated. In the communication system of the present invention, user terminals accessing the same network resource can communicate, for example, chat, with one another.

Another object of the present invention is to provide a network system using such a communication system.

The above objects of the present invention are achieved by a communication system applicable to a network system having a plurality of user terminals connected to a communication network and a plurality of network resources accessed by the user terminals, the communication system including a part for making the user terminals accessing the same network resource exchange and share communication information.

The above part for communication may include a communication server and a part, provided in each user terminal, for controlling communication, wherein the part for controlling communication includes a part for obtaining a resource locator which indicates a stored location of a network resource which is accessed by the above each user terminal and for notifying the communication server of the resource locator, a part for obtaining from the communication server information of the other user terminals accessing the network resource, and a part for exchanging the communication information with the other user terminals through the communication server; and wherein the communication server includes a part for grouping the above user terminals accessing the same network resource as one group on the basis of the resource locator notified of by the user terminals, a part for distributing information of the user terminals of the one group to the user terminals of the one group, and a part for distributing communication information sent from one of the user terminals to the other user terminals.

Each of the user terminals further includes a part for selecting at least one user terminal among the other user terminals accessing the same network resource with which each user terminal exchanges communication information.

The above communication system further may include a network resource following part for, if a specific user terminal among the user terminals of the one group switches a network resource accessed by the specific user terminal to another network resource, making the other user terminals of the one group access the another network resource.

The above network resource following part further includes:

a part, provided in each user terminal, for obtaining a switched resource locator indicating a stored location of another network resource and notifying the communication server of the switched resource locator;

a part, provided in the communication server, for receiving the switched resource locator from the specific user terminal and for distributing the switched resource locator to the other user terminals of the one group; and a part, provided in each user terminal, for making the user terminal access another network resource corresponding to the switched resource locator.

The above objects of the present invention are achieved also by a communication method applicable to a network system having a plurality of user terminals connected to a communication network, a plurality of network resources accessed by the user terminals and at least one communication server which makes the user terminals exchange communication information with one another, the communication method including the steps of:

notifying the communication server of resource locators indicating stored locations of the network resources accessed by the user terminals;

grouping information on the user terminals accessing the same network resource according to resource locators which indicate a stored location of the same network resource, and storing, in the memory of the communication server, the grouped information of the user terminals;

distributing the information on the user terminals accessing the same network resource to each of the user terminals accessing the same network resource with reference to the grouped information on the user terminals stored in the memory of the communication server;

selecting at least one user terminal with which each user terminal exchanges the communication information with reference to the distributed information of the user terminals;

sending the communication information addressed to at least one user terminal to the communication server; and distributing the communication information to the at least one user terminal from the communication server, and receiving the communication information from the at least one user terminal.

The above objects of the present invention are achieved also by an article of manufacture including a computer usable medium having computer-readable code means embodied therein for causing a computer, in a network system having a plurality of user terminals accessing network resources through a communication network and at least one communication server connected to the user terminals, to control each user terminal in a network system which has a part, provided in at least one communication server, for grouping the user terminals accessing the same network resource as one group and for distributing communication information sent from one of the user terminals of the one group to the other user terminals of the one group, the computer readable code means comprising:

computer-readable program code means for notifying the communication server of resource locators indicating stored locations of network resources being accessed by the user terminal;

computer-readable program code means for obtaining information of the other user terminals of the one group from the communication server; and computer-readable program code means for exchanging the communication information between user terminals of the one group through the communication server.

The above computer readable code means further including:

computer-readable program code means for, if a specific user terminal among the user terminals of the one group switches a network resource accessed by the specific user terminal to another network resource, notifying the communication server of a switched resource locator which indicates a stored location of another network resource by the specific user terminal; and computer-readable program code means for obtains the switched resource locator from the communication server and for accessing another network resource corresponding to the switched resource locator by the other user terminals.

The above object of the present invention are achieved also by an article of manufacture including a computer usable medium having computer-readable code means embodied therein for causing a computer, in a network system having a plurality of user terminals accessing network resources through a communication network and at least one communication server connected to the user terminals, to control the communication server in a network system which has means, provided in each user terminal, for notifying the communication server of a resource locator indicating a stored location of a network resource being accessed by the user terminal, for obtaining information of other user terminals accessing the network resource from the communication server and for exchanging communication information with the other user terminals through the communication server, the computer readable code means including:

computer-readable program code means for grouping the user terminals accessing the same network resource as one group in response to notification of resource locators indicating a stored location of the same network resource;

computer-readable program code means for distributing information of the user terminals of the one group to the user terminals of the one group; and computer-readable program code means for distributing communication information sent from the user terminals of the one group to the other user terminals of the one group.

The above computer readable code means may further include:

computer-readable program code means for, if a specific user terminal among the user terminals of one group switches a network resource accessed by the specific user terminal to another network resource, distributing a switched resource locator corresponding to another network resource to the user terminals accessing the same network resource.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
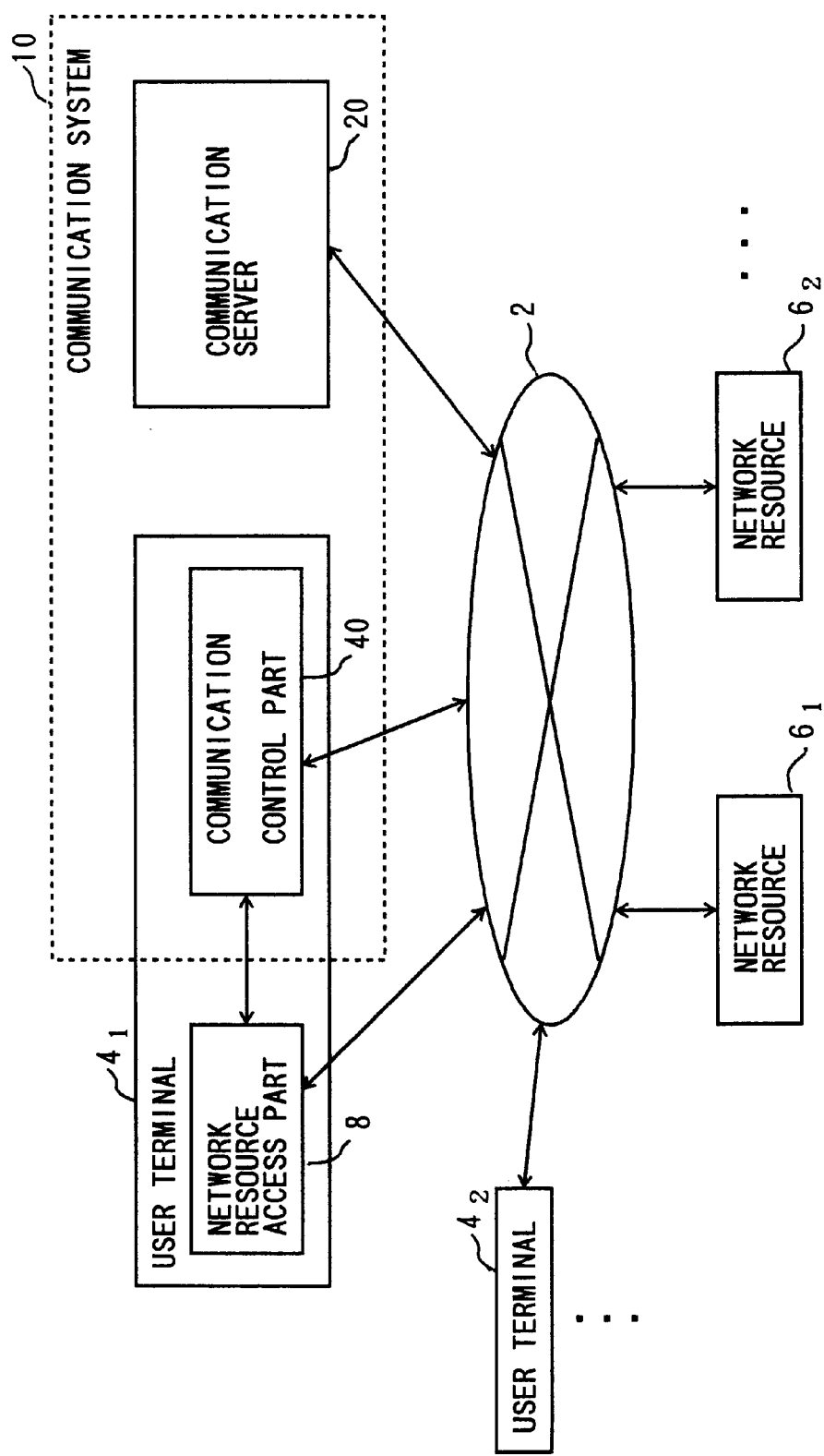
FIG. 1 is a block diagram of the principle of the present invention.

The principle of the present invention will now be described with reference to FIG. 1. As shown in FIG. 1, a network system has a communication network 2, user terminals $4_1, 4_2, \ldots$ connected to the communication network 2, and network resources $6_1, 6_2, \ldots$ accessed by the user terminals $4_1, 4_2, \ldots$ through the communication network 2. A communication system 10 according to the present invention has a communication part, which includes a communication server 20 and a communication control part 40.

Figure 2:
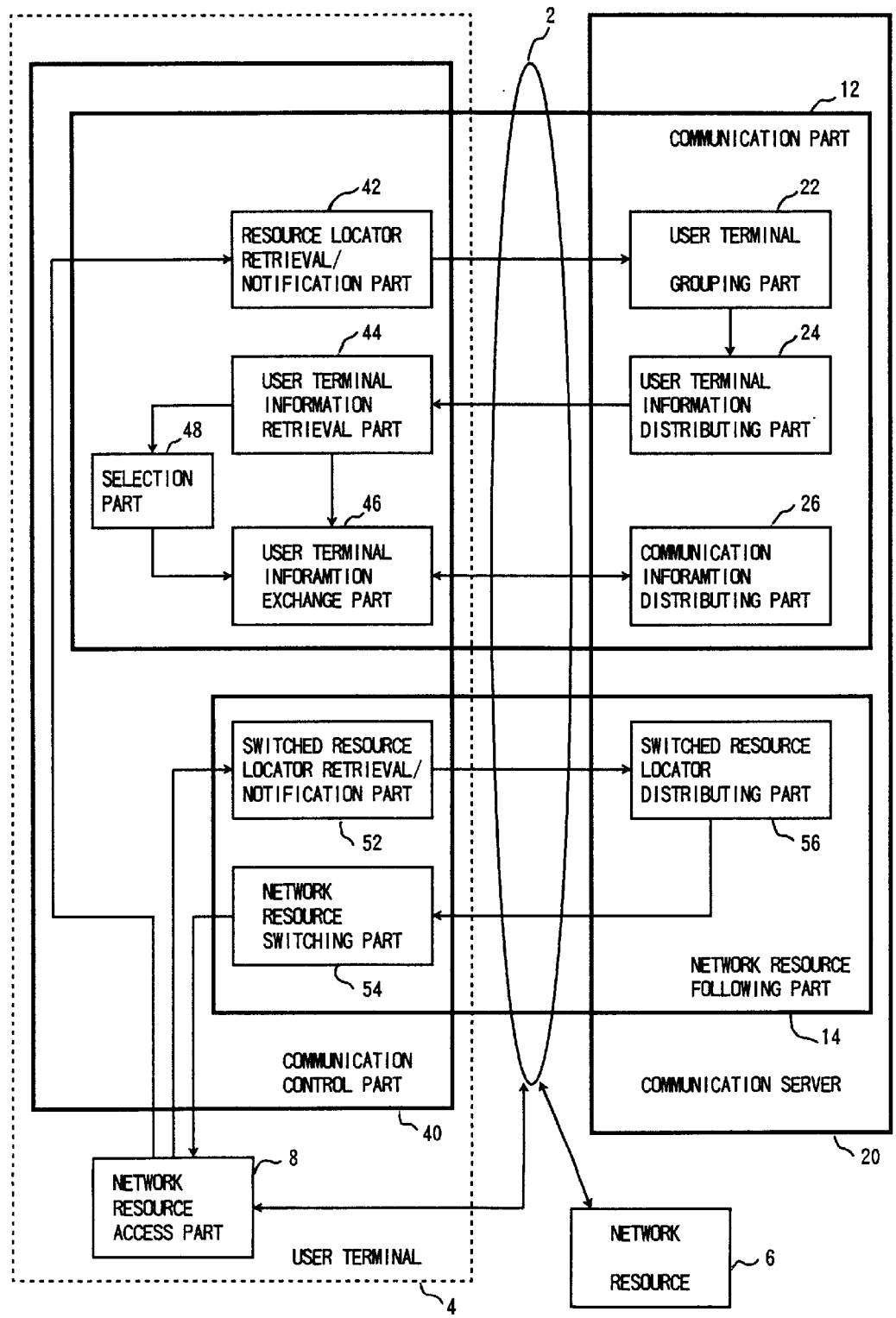
FIG. 2 is a block diagram of a communication system of the present invention.

FIG. 2 is a block diagram of the communication system 10 of the present invention. As shown in FIG. 2, the communication part includes the communication server 20 and the communication control part 40, which part 40 is included in each of the user terminals. The communication control part 40 includes a resource locator retrieval/ notification part 42, a user terminal information retrieval part 44, and a user terminal information exchange part 46. The resource locator retrieval/notification part 42 retrieves a resource locator indicating a stored location of the network resource 6 which is accessed by the user terminal 4, and sends a notification about the resource locator to the communication server 20. The user terminal information retrieval part 44 retrieves information about the other user terminals which are accessing the network resource 6 from the communication server 20. The user terminal information exchange part 46 exchanges communication information with the other user terminals through the communication server 20.

The communication server 20 includes a user terminal grouping part 22, a user terminal information distributing part 24, and a communication information distributing part 26. The user terminal grouping part 22 groups the user terminals which are accessing the same network resource 6 as one group on the basis of the resource locator which is notified of by the user terminals. The user terminal information distributing part 24 distributes information of user terminals grouped in the above-mentioned one group to the user terminals. The communication information distributing part 26 distributes the communication information sent from the user terminals grouped in the same group to the other user terminals.

The user terminal 4 further has a selection part 48 which selects, from among the other user terminals accessing the network resource, user terminals with which the user terminal 4 exchanges the communication information.

Further, the communication system of the present invention has a network resource following part 14. If a specific user terminal of the group changes the target network resource from the network resource to another network resource, the network resource following part 14 lets the other user terminals access the newly accessed network resource.

The network resource following part 14 includes a switched resource locator retrieval /notification part 52, a switched resource locator distributing part 56, and a network resource switching part 54.

The switched resource locator retrieval /notification part 52 retrieves a switched resource locator indicating the stored location of the newly accessed network resource, and notifies the communication server 20 of the switched resource locator. The switched resource locator distributing part 56, which is provided in the communication server 20, receives the switched resource locator from the user terminal, and distributes the switched resource locator to the other user terminals of the group. The network resource switching part 54 is provided in each user terminal, and lets the user terminal switch the target network resource to another network resource corresponding to the switched resource locator.

Figure 3:
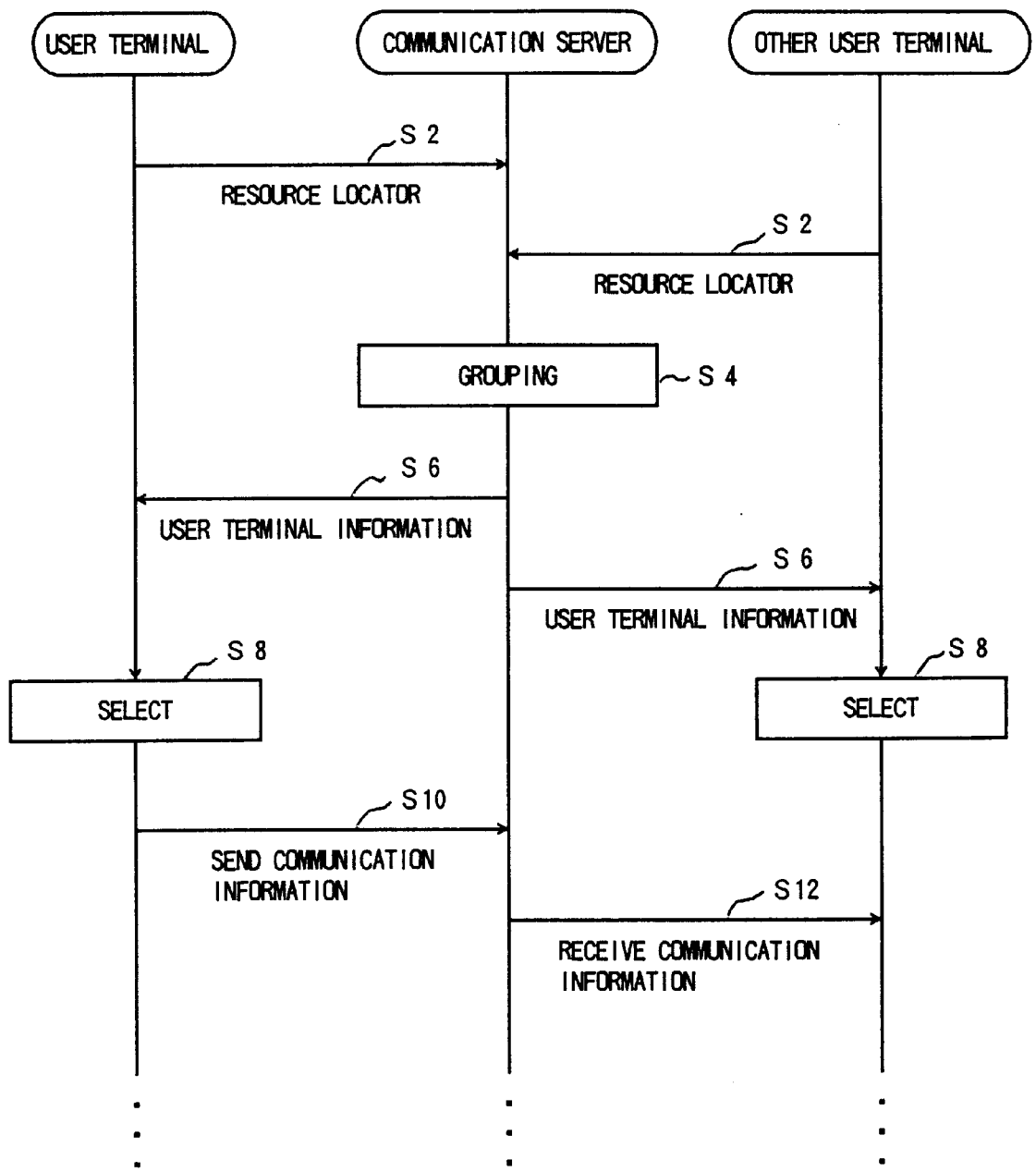
FIG. 3 is a sequence chart for explaining the principle of a communication method of the present invention.

FIG. 3 is a sequence chart for explaining the principle of the communication method of the present invention. As shown in FIG. 3, the communication method of the user terminal according to the present invention comprises steps 2, 4, 8, 10, and 12. In step 2 (hereinafter, in the figures, step is abbreviated as "S".), the communication server is notified of a resource locator which indicates the location of a network resource accessed by the user terminal through the communication network. In step 4, information of the user terminals which are accessing the network resource is grouped by resource locators indicating same network resource, and stored in a memory of the communication server. In step 6, information of the other user terminals accessing the same network resource is distributed to each user terminal accessing the same network resource by using the information of the grouped user terminals stored in the memory of the communication server. In step 8, the user terminal selects one or more user terminals with which the user terminal exchanges its communication information by referring to the distributed information of the other user terminals. In step 10, the communication information addressed to the selected user terminals is sent to the communication server from the user terminal. In step 12, the communication information distributed to the addressed user terminals from the communication server is retrieved by the addressed user terminals.

The communication system may be embodied in such a form that each user terminal accesses network resources such as, for example, home pages (home pages are network lists such as electronic documents which are on public view by HTTP). In this case, a uniform resource locator is used as the resource locator.

The communication server manages collectively uniform resource locators corresponding to home pages and information of users who are accessing the home pages. At any given time, the users who are collectively managed may include users who have accessed the home pages before and users who are currently accessing the home pages. In this way, by grouping together users who have accessed or are accessing the same uniform resource locator, a HP (Home Page) following type communication system is provided, by which users can exchange and share communication information within the group.

In other words, according to the communication system embodied by the present invention, in a system in which a user terminal browses a resource accessed by specific users or by any number of users (hereinafter the term "browser" will be used as a system like this), a user who is accessing a network resource or a resource locator which indicates the location of the network resource by using specific or indefinite protocols is provided with a list of other users who are accessing the same network resource or the same resource locator.

The communication information which is transmitted by the communication system according to the present invention includes messages comprising characters, voice, images, moving images, and so on. Because the communication system has a function to send the messages to the users selected among users belonging to the same group (for example, all users, all users excluding some users, or a specific other party), users can store and send information comprising characters, voice, images, moving images and so on to all users, all users except same users, or the specific other party accessing the same uniform resource locator.

And because the communication system is provided with a function to provide a list of other users who are accessing the same network resource or the same resource locator, a function to send messages to users selected among users who belong to the same group, and a function to let user terminals switch their same home page automatically to another home page to which a specific user switched from the same home page in response to a switching operation by the specific user, the HP-following-type communication system in which users of a same group can share the same home page while they move between various home pages is embodied.

Further, by obtaining information of users before and after switching of network resources, the communication system can provide access history information of the users.

Figure 4:
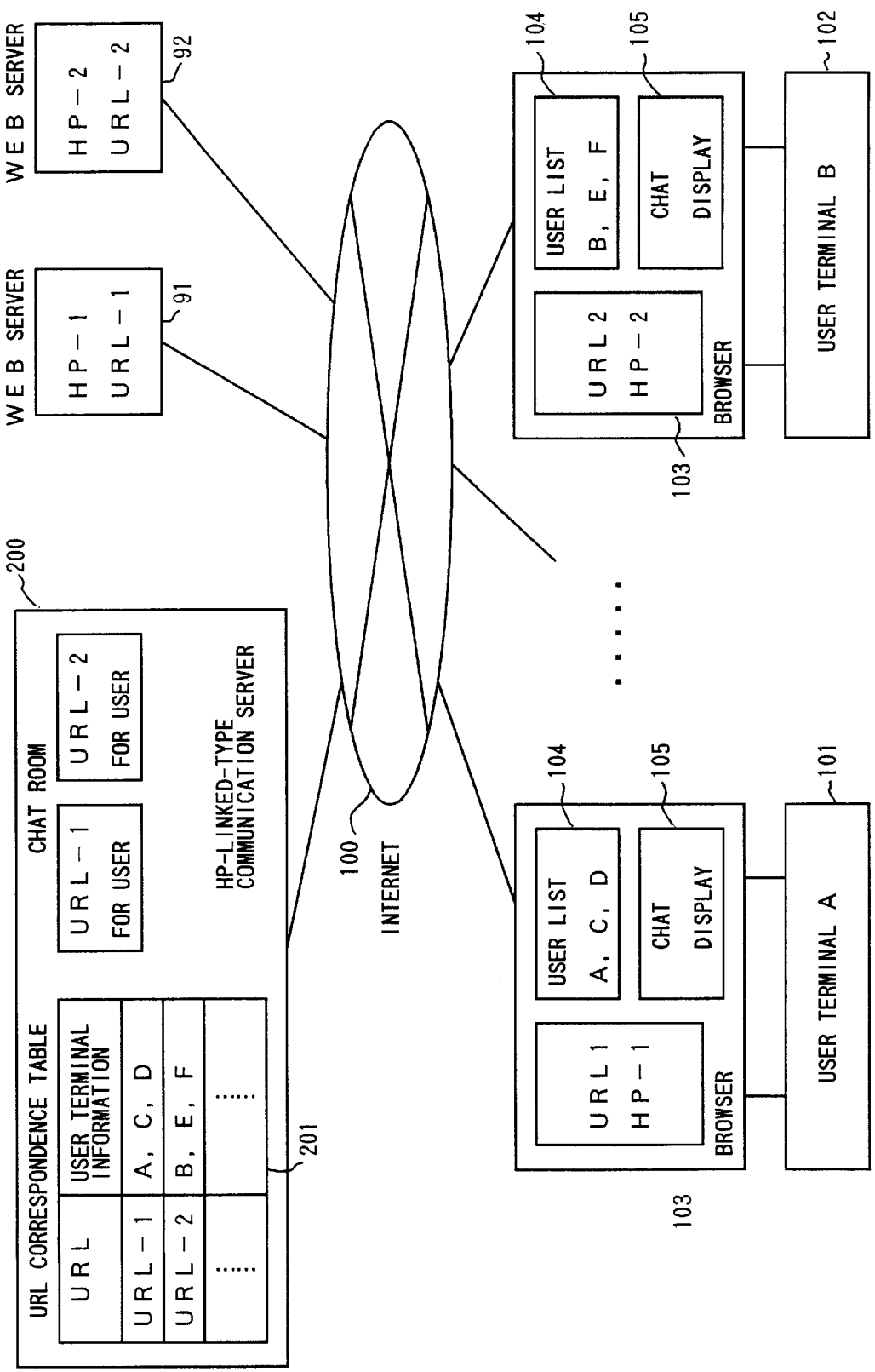
FIG. 4 is a block diagram of a communication system according to an embodiment of the present invention.

In the following, an embodiment of the present invention will be described precisely with reference to FIG. 4 to FIG. 9. First, as shown in FIG. 4 which shows a block diagram of the communication system according to an embodiment of the present invention, a plurality of user terminals 101, 102, . . . is connected to an HP-linked-type communication server 200 and a plurality of web servers 91, 92, . . . through the Internet 10. The web servers may be any type of servers as long as they are connected to the Internet. The user terminals use browsers which are generally on the market (such as the Netscape Navigator™ of Netscape Inc.), access any uniform resource locator, and refer to the home pages. The HP-linked-type communication server 200 includes a URL correspondence table 201 which stores URLs of home pages referred to by the user terminals and information of the user terminals corresponding to the URLs by receiving URL information sent from the user terminals. The HP-linked-type communication server 200 makes a user list 104 which is a list of user terminals connected to the same URLs by referring to the URL correspondence table 201, and sends the list 104 to the user terminals 101, 102, . . .

The user terminals 101, 102, . . . refer to the user list 104 sent from the HP-linked-type communication server 200, select all users or specific users in the list, then connect to the HP-linked-type communication server 200, and communicate with other users in a chat room by using a communication information sharing function which is provided by the HP-linked-type communication server.

In this embodiment, there is one HP-linked type-communication server. However, the servers may be distributed among several locations in clusters by classifying URLs by domain names (for example, by co.jp, ac.jp and ne.jp).

In this embodiment, chat is described as communication. However, voice conversation, mail exchange, image exchange games (for example, a game of "scissors, paper, rock"), and so on are available.

Figure 5:
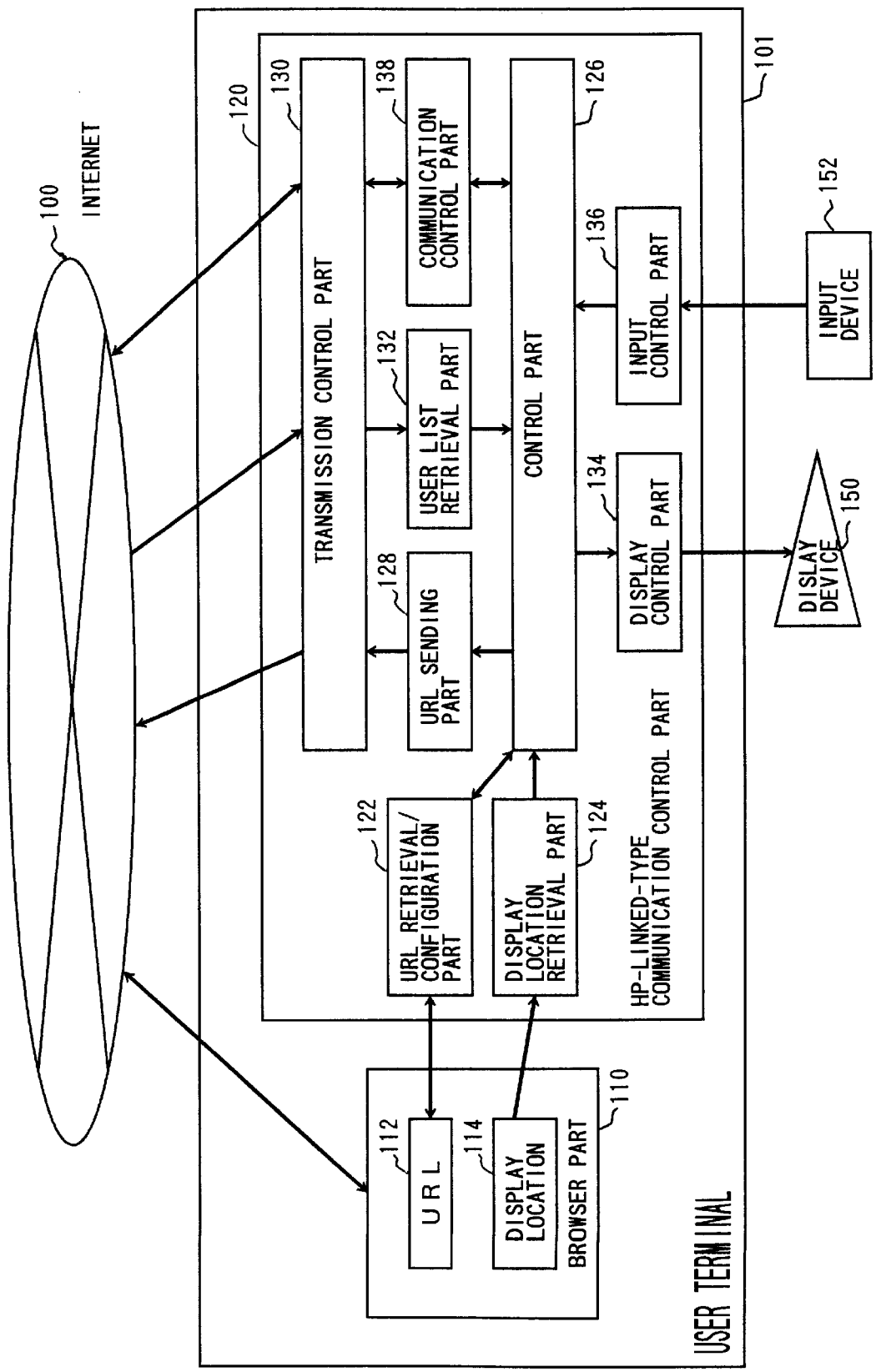
FIG. 5 is a block diagram of a user terminal according to an embodiment of the present invention.

FIG. 5 is a block diagram of the user terminal according to an embodiment of the present invention. As shown in FIG. 5, the user terminal 101 comprises a browser part 110 and an HP-linked-type communication control part 120. The browser part 110 is a browser generally on the market (for example, Netscape Navigator™ of Netscape Inc. and so on).

In the following, according to this embodiment, the operation of the user terminal 101 for displaying communication information with other users accessing the same URL will be described with reference to FIG. 5 and a flowchart shown in FIG. 6.

Figure 6:
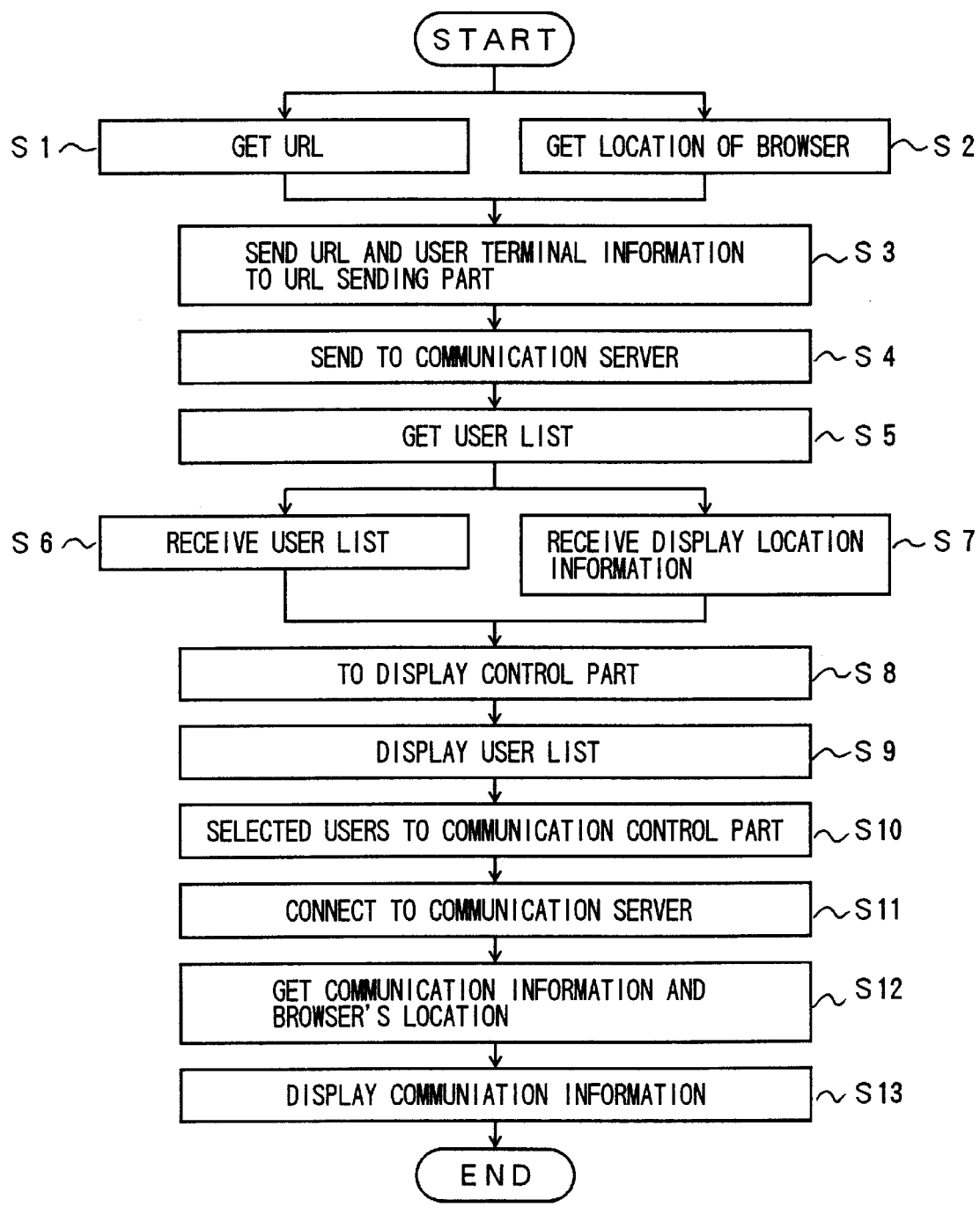
FIG. 6 is a flowchart for explaining an operation of the embodiment shown in FIG. 5.

As shown in FIG. 6, in step 1, a URL retrieval/configuration part 122 in the communication control part 120 in FIG. 5 retrieves a URL being accessed by the browser part 110. For example, in the case of using Netscape Navigator™ of Netscape Inc. as a browser, it is known that the URL being accessed can be retrieved by using a function WWW_RegisterURLEcho which is open to the public. The URL retrieval/configuration part 122 may use a URL which was retrieved beforehand and stored.

In step 2, a display location retrieval part 124 in FIG. 5 retrieves display location information indicating a display location 114 of the browser part 110 on the display.

In step 3, a control part 126 in FIG. 5 sends URL information (on a new URL after a switch and on an old URL before a switch) based on the URL retrieved by the URL retrieval/configuration part 122 and user terminal information stored beforehand to a URL sending part 128 as a message. In step 4, the URL sending part 128 sends the message to the communication server 200 through a transmission control part 130.

In step 5, a user list retrieval part 132 retrieves a user list from the communication server 200. (The user list is a list of the user terminals which are accessing the same URL.) The control part 126 in step 6, receives the user list from the user list retrieval part 132, in step 7, receives the display location information from the display location retrieval part 124, and in step 8, sends the user list and the display location information to a display control part 134.

In step 9, the display control part 134 controls a display device 150 to display the user list without overlapping with the browser.

A user may use an input device 152 in FIG. 5 in order to select from the user list displayed on the display device 150 other users with whom the user wishes to communicate. If the user need not to select certain users, all other users may be targets to communicate with. In step 10, an input control part 136 sends user information input from the input device 152 to a communication control part 138 through the control part 126.

In step 11, the communication part 138 in FIG. 5 connects to the communication server 200, and provides communication such as chat, voice conversation, image exchange, and mail exchange. The display control part 134 in step 12, receives the communication information and the display location information of the browser through the control part 126, and in step 13, controls the display device 150 to display the communication information without overlapping with the browser.

In addition, voices, images, character information and so on input from the input device 152 are sent to the control part 126 via the input control part 136, and then are processed to become communication information in the control part 126. The processed communication information is sent to the communication control part 138 from the control part 126, and then is sent to the communication server 200.

Further, the communication control part 138 can obtain a URL being accessed by other users by referring to the terminal number of the users, and can configure the URL being accessed by the other users to the browser part 110 from the URL retrieval /configuration part 122 via the control part 126. For example, in the case of using Netscape Navigator™ of Netscape Inc. as a browser, it is known that the URL being accessed can be retrieved by using a function WWW_RegisterURLEcho which is open to the public. Therefore, it is possible to communicate with other users while a plurality of users move from one HP to another HP simultaneously.

Figure 7:
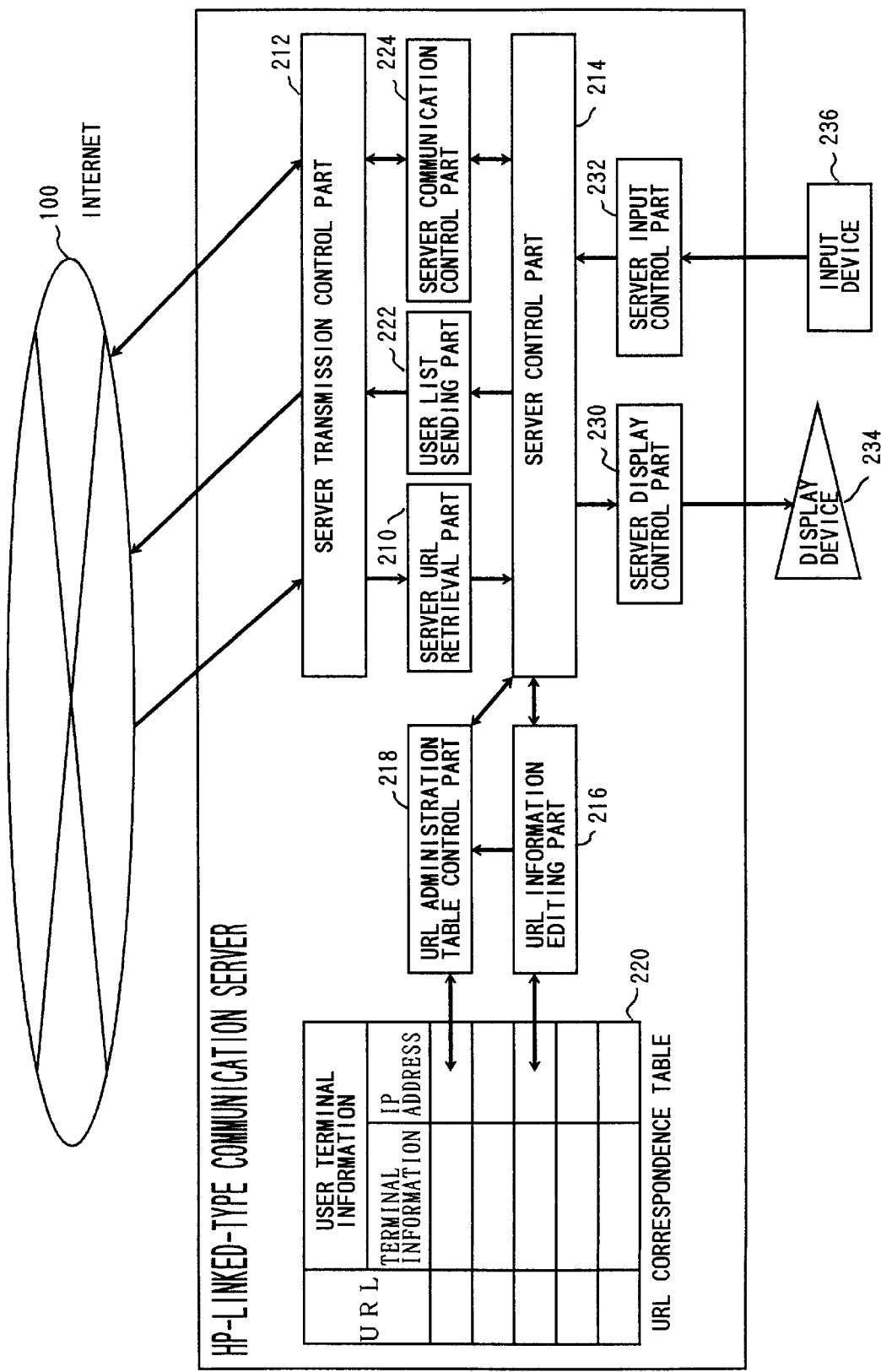
FIG. 7 is a block diagram of a communication server according to an embodiment of the present invention.
Figure 8:
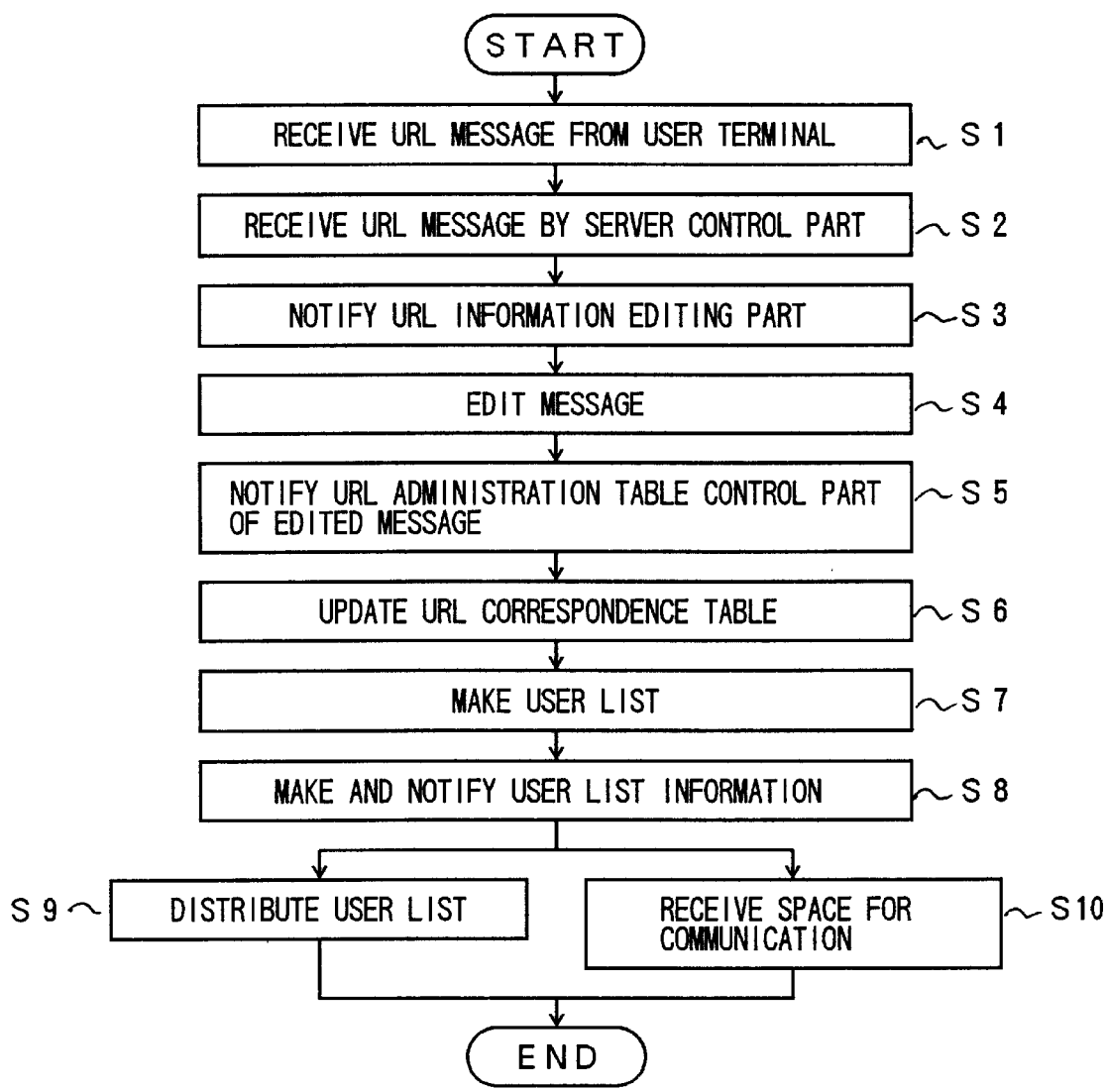
FIG. 8 is a flowchart for explaining an operation of the embodiment shown in FIG. 7.

FIG. 7 is a block diagram of the communication server 200 connected to the user terminal 101 through the Internet 100. FIG. 8 is a flowchart for explaining an operation of the communication server 200. In the following, the operation of the communication server will be described with reference to FIG. 7 and FIG. 8.

In step 1, a server URL retrieval part 210 receives a message which notifies of URLs from the user terminal 101 through a server transmission control part 212.

A server control part 214, in step 2, receives the message from the server URL retrieval part 210, and then, in step 3, notifies a URL information editing part 216 of the message.

In step 4, the URL information editing part 216 edits the message by doing rounding manipulation, that is to say, deleting redundant information in the message (for example, file names and so on), and makes URL information as a result of the editing. The method of editing may be set beforehand by an administrator, and so on. In order to edit the URL information, the URL information editing part 216 searches across a URL correspondence table 220 for the new URL and the old URL included in the received message, and checks whether there are any entries in the URL correspondence table 220 which match the new URL or the old URL. If there is at least one entry which matches, the URL information editing part 216 edits the new URL or the old URL included in the received message such that the new URL or the old URL matches the URL in the entry.

In step 5, the URL information editing part 216 notifies a URL administration table control part 218 of the edited new and old URL. Further, an administrator can store URL information in the URL correspondence table 220. The URL information is stored in the URL correspondence table 220 through an input device 236, a server input control part 232, the server control part 214, the URL information editing part 216, and the URL administration control part 218.

In step 6, the URL administration control part 218 updates the URL correspondence table 220 according to the edited new URL and old URL sent from the URL information editing part 216, and the user terminal information sent from the server control part 214. For this purpose, the user terminal information retrieved from the server control part 214 is added to a user terminal information part in the entry of the URL correspondence table 220 which has a URL part with the new URL. On the other hand, said user terminal information is deleted from the user terminal information part in the entry of the URL correspondence table 220 which has a URL part with the old URL. If there is not the new URL in the URL correspondence table 220, a entry with a URL part which corresponds to the new URL is made in the correspondence table 220, and the user terminal information retrieved from the server control part 214 is set in the user terminal information part. As a result of the update, a entry which has no user terminal information corresponding to the URL part is deleted from the URL correspondence part 220.

In step 7, the server control part 214 makes a user list corresponding to the old URL and a user list corresponding to the new URL according to the information from the URL administration table control part 218. The user lists comprise URLs and the corresponding terminal information. In step 8, the server control part 214 makes user list information to which IP addresses corresponding to the terminal information are added, and notifies a user list sending part 222 and a server communication control part 224 of the user list information.

In step 9, according to the received user list information, the user list sending part 222 distributes user lists to all user terminals included in the user lists by using the IP addresses.

Further, information of all user terminals of the group is sent to user terminals newly joined to the group, and information of user terminals newly joined and withdrawn is sent to user terminals already joined.

In step 10, the server communication control part 224 reserves memory space for communication corresponding to the user list information. Then, if the server communication control part 224 receives communication information such as character strings, voice, mail, images, and so on, it can distribute the communication information to all user terminals listed in the user lists or specific user terminals. As such a distribution control of communication information, for example, OnLive™ provided by OnLiveTechnology Inc. is known as a prior art.

Further, various information exchanges among terminals listed on the user list may be realized, by linking the server communication control part 224 to application programs such as games and education, and by utilizing the application programs and the user list in combination.

Furthermore, the server communication control part 224 may be configured in such a way that in response to a request from a user terminal the part 224 controls the URL administration table control part 218 search the URL correspondence table 220 via the server control part 214, and then the part 224 obtains information of a URL accessed by a specific user and sends the information to other user terminals.

A network resource following function of the present invention is embodied as follows. First, a user terminal which has authority to host the network resource following is determined beforehand. Then, if the user terminal switches URL to another URL, information of the other URL is sent to the communication server. After the communication server sends the other URL to the other user terminals, the URLs accessed by the other user terminals are switched forcefully. Furthermore, if a user terminal makes a request for the authority to the communication system, the authority may be given to the user terminal in accordance with judgment of the present holder of the authority.

Furthermore, the HP-linked-type communication server may be configured in such a way that by storing and providing access history information, personal information, or statistical information on users who have accessed specific URLs, the HP-linked-type communication server can respond to various inquiries from users regarding the information.

The above-mentioned embodiment is described based on the composing elements of the communication system. However, the present invention is not limited to the embodiment. For example, it is possible to construct each composing element of the communication system by using a program and to provide the communication service by running the program on a computer system.

Figure 9:
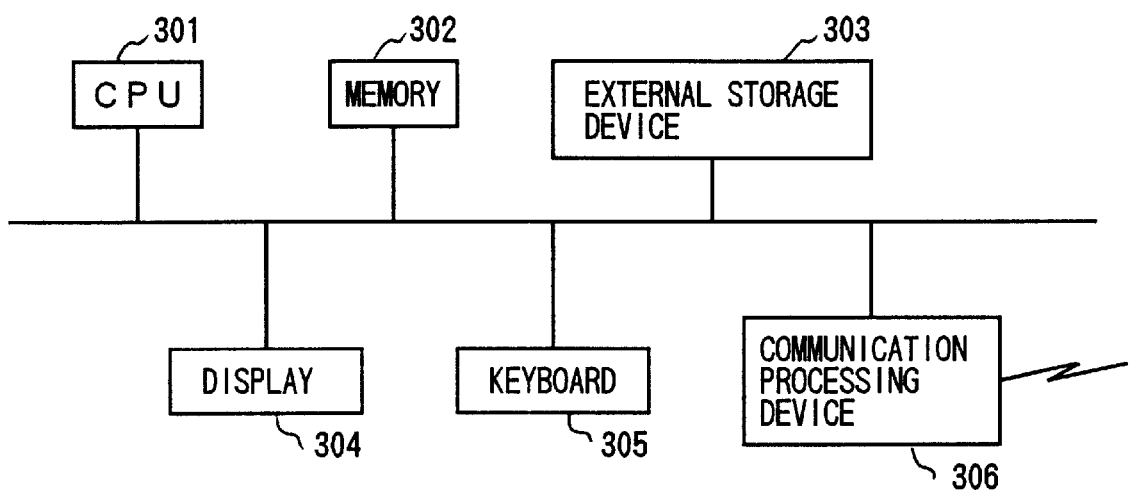
FIG. 9 is a block diagram of a computer system hardware which may be used for the communication server or the user terminal according to the present invention.

FIG. 9 is a block diagram of computer system hardware which may be used for the communication server or the user terminal according to the present invention. The computer system comprises a CPU 301 carrying out tasks, a memory 302 storing programs and data, an external storage unit 303 storing programs and data used by the memory 302 or CPU 301, a display 304 displaying data, a keyboard 305 used for inputting data or instructions, and a communication processing device 306 for communicating with other computers through networks.

The computer usable medium of the present invention corresponds to the memory 302 and/or the external storage device 303. The program carrying out the process is stored in the memory 302 and/or the external storage unit 303, and is run on the CPU 301, and then the process of the embodiment is carried out. Further, the computer usable medium of the present invention is embodied by an electronic memory, a hard disk, or by a transportable medium such as a floppy disk, a CD-ROM, a magnetic tape and so on. By loading the program for controlling the server stored in the medium into a computer system, and by loading the program for controlling the user terminal stored in the medium into another computer system, an existing computer system can be used as the user terminal or the communication server of the communication system of the present invention. And the program stored in the medium of the present invention may be pre-installed in a computer system.

As described above, according to the communication system of the present invention which uses a communication network such as the Internet, a group of users accessing the same network resource is formed automatically, then communication is available within the group, and users can advantageously enjoy communication, for example, by chatting about information on the network resource. Also, according to the present invention, even when accessing web servers which have no chat function, users can enjoy the same services as ones provided by network resources having only the chat function. Therefore, a server operator advantageously need not install chat programs into all servers.

Further, users can chat while moving between network resources and sharing the same network resources at all times. Therefore, for example, service providers of a tourist guide, a restaurant guide or a company's prospectus can provide their services to their users on network resources one after another.

Furthermore, users of the communication system of the present invention can advantageously know to what extent a network is busy being accessed resource with reference to a user list.

The present invention is not limited to the specifically disclosed embodiments, and variations and modifications may be made without departing from the scope of the invention.

What is claimed is:

1. A communication server in a communication network including a plurality of user terminals and a plurality of network resources accessed by said user terminals, said user terminals each comprising: means for obtaining a resource locator which indicates a location of a network resource and for notifying said communication server of said resource locator; and means for notifying said communication server of a switched resource locator when said user terminal switches its access destination; said communication server comprising: a resource locator correspondence table which includes resource locators and user lists, each resource locator being associated with a user list which includes user terminals which access said each resource locator;

means for distributing user terminal information in said user list to user terminals included in said user list;

information exchanging means for receiving communication information from a first user terminal and sending said communication information to user terminals in said user list which includes said first user terminal, said communication information being used for communication among users of said user terminals;

means for receiving said switched resource locator and updating said resource locator correspondence table on the basis of said switched resource locator;

means for distributing user terminal information in the updated user list to user terminals in said updated user list; and wherein user terminals in a specific user list displays the same network resource image of a resource locator which corresponds to said specific user list while said user terminals in said specific user list exchange said communication information.

2. The communication server as claimed in claim 1, further comprising:

means for receiving a new resource locator and an old resource locator from a user terminal when said user terminal switches its access destination from said old resource locator to said new resource locator;

means for deleting said information of said user terminal from a second user list in said resource locator correspondence table, said second user list corresponding to said old resource locator;

means for distributing said first user list and said second user list to user terminals.

3. The communication server as claimed in claim 2, further comprising:

means for generating a part including said new resource locator and said first user list when said first user list does not exist in said resource locator correspondence table.

4. The communication server as claimed in claim 1, further comprising network resource following means for, if a specific user terminal among said user terminals in said user list switches its access destination from a resource locator to another resource locator, distributing said another resource locator to said user terminals in said user list.

5. An article of manufacture comprising a computer usable medium having computer-readable code means embodied therein for causing a communication server, in a communication network including a plurality of user terminals and a plurality of network resources accessed by said user terminals, to perform processing, said user terminal comprising: means for obtaining a resource locator which indicates a location of a network resource and for notifying said communication server of said resource locator; and means for notifying said communication server of a switched resource locator when said user terminal switches its access destination, said computer readable code means comprising:

computer-readable program code means for storing a resource locator correspondence table which includes resource being associated with a user list which includes user terminals which access said each resource locator;

computer-readable program code means for distributing user terminal information in said user list to user terminals included in said user list;

information exchanging computer-readable program code means for receiving communication information from a first user terminal and sending said communication information to user terminals in said user list which includes said first user terminal, said communication information being used for communication among users of said user terminals;

computer-readable program code means for receiving said switched resource locator and updating said resource locator correspondence table on the basis of said switched resource locator;

computer-readable program code means for distributing user terminal information in an updated user list to user terminals in said updated user list; and wherein user terminals in a specific user list displays the same network resource image of a resource locator which corresponds to said specific user list while said user terminals in said specific user list exchange said communication information.

6. The article of manufacture comprising a computer usable medium as claimed in claim 5, further comprising:
  computer-readable program code means for receiving a new resource locator and an old resource locator from a user terminal when said user terminal switches its access destination from said old resource locator to said new resource locator;
  computer-readable program code means for adding information of said user terminal to a first user list in said resource locator correspondence table, said first user list corresponding to said new resource locator;
  computer-readable program code means for deleting said information of said user terminal from a second user list of said resource locator correspondence table, said second user list corresponding to said old resource locator;
  computer-readable program code means for distributing and first user list and said second user list to user terminals.

7. The article of manufacture comprising a computer usable medium as claimed in claim 6, further comprising: computer-readable program code means for generating a part including said new resource locator and said first user list when said first user list does not exist in said resource locator correspondence table.

8. The article of manufacture comprising a computer usable medium as claimed in claim 5, further comprising network resource following computer-readable program code means for, if a specific user terminal among said user terminals in said user list switches its access destination from a resource locator to another resource locator, distributing said another resource locator to said user terminals in said user list.

* * * * *